United States Patent
Rehtanz et al.

(10) Patent No.: US 6,885,915 B2
(45) Date of Patent: Apr. 26, 2005

(54) CONFIGURATION OF A PART OF AN ELECTRICAL POWER DISTRIBUTION NETWORK

(75) Inventors: Christian Rehtanz, Baden-Dättwil (CH); Dirk Westermann, Zürich (CH); Peter Bosshart, Wohlen (CH)

(73) Assignee: ABB Research LTD, Zurich (CH)

( * ) Notice: Subject to any disclaimer, the term of this patent is extended or adjusted under 35 U.S.C. 154(b) by 241 days.

(21) Appl. No.: 10/161,652

(22) Filed: Jun. 5, 2002

(65) Prior Publication Data

US 2003/0014234 A1 Jan. 16, 2003

(30) Foreign Application Priority Data

Jun. 7, 2001 (EP) .......................................... 01113879

(51) Int. Cl.$^7$ ............................................... G05D 29/00
(52) U.S. Cl. ........................ 700/291; 700/286; 703/18
(58) Field of Search ........................ 700/90, 286, 291; 703/13, 18

(56) References Cited

FOREIGN PATENT DOCUMENTS

| DE | 4209168 A1 | 9/1993 |
|---|---|---|
| EP | 0803964 A2 | 10/1997 |

OTHER PUBLICATIONS

D. Atanackovic, et al., "An Integrated Knowledge–Based Model for Power–System Planning", IEEE Expert, Jul./Aug. 1997, pp. 65–71.

J. Shao, et al., "An Expert System for Secondary Distribution System Design", IEEE Transactions on Power Delivery 6, No. 4, Oct. 1991, New York, USA, pp. 1607–1615.

J. Tiihonen, et al., "Modeling Configurable Product Families", 4$^{th}$ WDK Workshop on Product Structuring, Delft University of Technology, Delft, The Netherlands, Oct. 22–23, 1998, pp. 1–22.

*Primary Examiner*—Jayprakash N. Gandhi
(74) *Attorney, Agent, or Firm*—Burns, Doane, Swecker & Mathis, L.L.P.

(57) ABSTRACT

The method according to the invention is based on a configuration model of a part of an electrical power distribution network, describing a totality of possible configurations of appliances. The configuration model is used to systematically produce (2) all the possible configurations which satisfy a predetermined set of functional requirements, in which case each possible configuration may have at least one associated characteristic value, and a solution configuration is defined which optimizes this characteristic value. It is thus possible to produce an optimum configuration automatically, without any need for expert knowledge about the appliances used in the configuration. In one preferred embodiment of the invention, a simulation model for simulation of a technical response of the solution configuration is produced automatically (3). It is thus possible to test one or more solution configurations by simulations (4), without any need for expert knowledge about the characteristics and simulation models of the appliances used in the solution configuration.

10 Claims, 6 Drawing Sheets

_US 6,885,915 B2_

CONFIGURATION OF A PART OF AN ELECTRICAL POWER DISTRIBUTION NETWORK

FIELD OF THE INVENTION

The invention relates to the field of electrical power distribution at the medium-voltage or high-voltage level.

BACKGROUND OF THE INVENTION

When upgrading or modernizing an electrical power transmission or distribution network, parts of such a network are newly produced or are produced instead of existing devices. Parts of a network such as those include, for example, transmission lines, switchgear assemblies, wattless component compensation devices etc. A network operator and/or a manufacturer of appliances and systems carries out a comprehensive analysis for planning purposes. The aim of the analysis is to define a configuration of appliances and/or systems which can be introduced into the network and satisfies predetermined technical and financial requirements of the network operator. One result of this analysis is a defined configuration, that is to say a planned arrangement of specific appliances from that manufacturer. One problem that arises when defining this configuration is that, firstly, the network operator knows his requirements and has simulation systems by means of which he can test and compare various possible configurations. However, human experts are required to do this, who not only know the simulation systems but also have extensive knowledge about the range of appliances from that manufacturer and about their configuration options. Secondly, the manufacturer has knowledge about his appliances, in particular about simulation models. However, he cannot, or else does not wish to, make these fully available to the network operator. Even if they are available to the network operator, the network operator will nevertheless often determine technically and financially suboptimum configurations, since he is using only solutions that are known by him, without including new products and their new characteristics, and since he cannot have an overview of and assess all the aspects of the appliances and appliance combinations.

SUMMARY OF THE INVENTION

One object of the invention is therefore to provide a method and a computer program product for configuration of a part of an electrical power distribution network of the type mentioned initially, which make it possible, based on network operator requirements, to determine automatically an appliance configuration which satisfies the requirement in an optimum manner.

The method according to the invention is thus based on a configuration model which describes a totality of possible configurations of appliances, and the configuration model is used to systematically produce all the possible configurations which satisfy a predetermined set of requirements, in which case each possible configuration may have at least one associated characteristic value, and a solution configuration is defined which optimizes this characteristic value.

It is thus possible to produce an optimum configuration automatically, without needing any expert knowledge about the appliances used in the configuration. In particular, it is possible to specify functional requirements for a configuration, that is to say requirements for an operating behavior of the configuration. This contrasts with conventional design procedures, in which specific appliances and their interconnection are specified, followed by which this interconnection is analyzed in order to check whether it satisfies specific requirements.

In one preferred embodiment of the invention, a simulation model for a simulation of a technical response produces the solution configuration automatically. It is thus possible to test one or more solution configurations by simulation, without needing any expert knowledge about the characteristics and simulation models of the appliances used in a solution configuration.

In one preferred embodiment of the invention, the set of requirements has specifications for the solution configuration. It is thus possible to restrict the search for desired solution variants, and to exclude configurations in which there is no interest from the start.

In a further preferred embodiment of the invention, the parameter which is predetermined and is to be optimized represents not only electrical variables but also, for example, costs of a configuration, the space required by a configuration, the reliability of a configuration, the risk of a configuration, the efficiency of a configuration or maintenance costs for a configuration.

The computer program product for configuration of a part of an electrical power distribution network according to the invention can be loaded into an internal memory in a digital data processing unit, and has computer program code means which, if they are embodied in a digital data processing unit, cause these to carry out the method according to the invention. In one preferred embodiment of the invention, the computer program product has a computer-legible medium on which the computer program code means are stored.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings and their meanings are listed in summary form in the list of reference symbols. In principle, identical parts are provided with the same reference symbols in the figures.

DETAILED DESCRIPTION OF THE INVENTION

Figure 1:
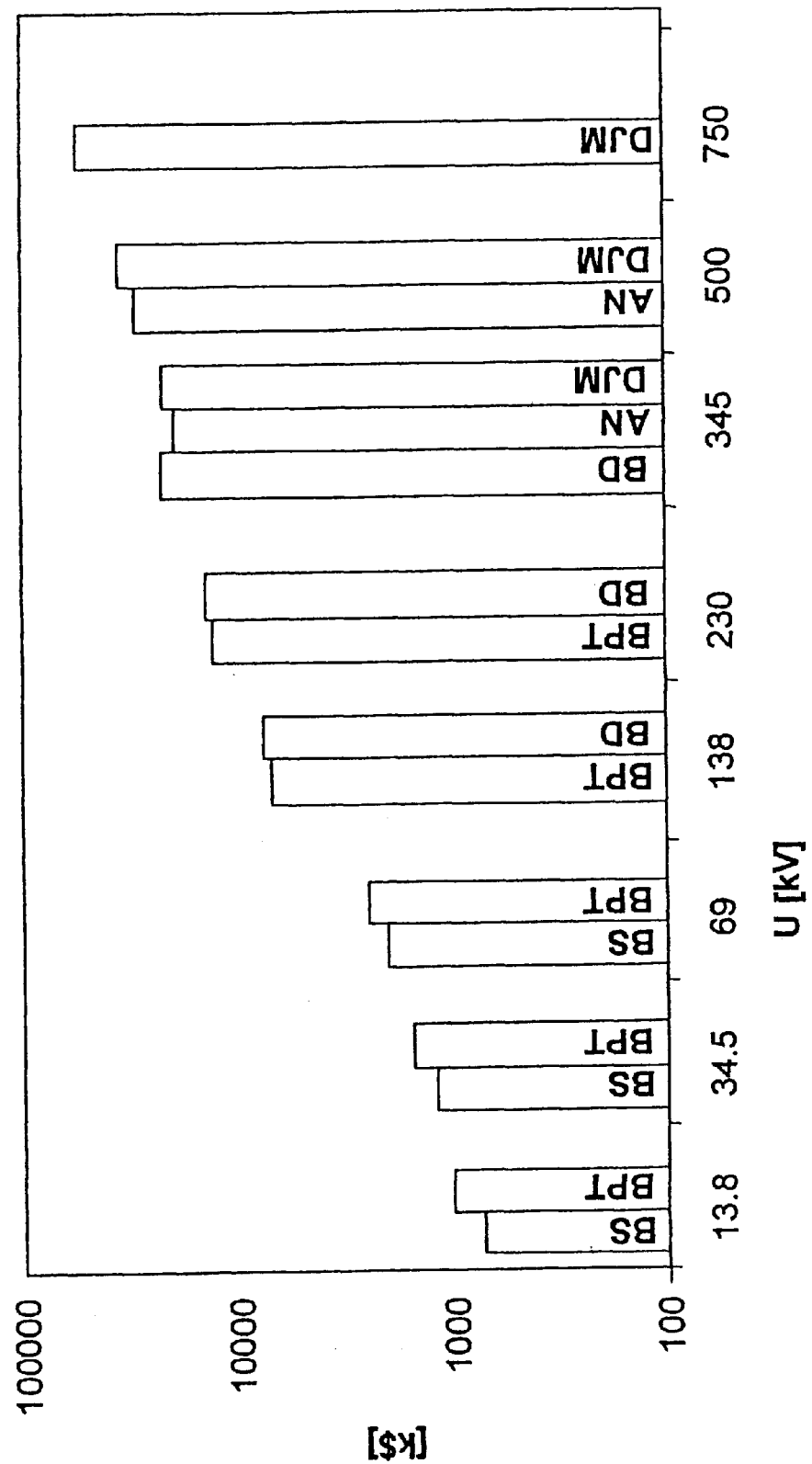
FIG. 1 shows a graphical illustration, comparing various switchgear assemblies that comply with different requirements.

According to the invention, a part of a power transmission or power distribution network is considered as a network function or power system function which is carried out by this part. Thus, for example, a part of a network which comprises a high-voltage line together with associated protection and compensation devices carries out a "power transmission" network function or, specified more precisely, a "point-to-point connection" or "multipoint connection" network function. Conversely, the "power transmission" network function may be implemented in various ways, for example by an AC or DC connection and with different voltage levels, by means of an overhead line or a cable. A "switch connections" network function can be implemented by means of a switchgear assembly with a different number of busbars. A "wattless component compensation" network function can be implemented, for example, by means of capacitors, inductors or a "static Var compensator". A "current regulation" network function can be implemented by converters of different topology at various points in the part of the network to be configured, and using different topology at various points in the part of the network to be configured, and using different semiconductor components such as thyristors, IGBTs, GTOs, or IGCTs. The "transform voltage", "control power flow" or "limit current" network functions can likewise each be implemented by a number of different appliances or by appliance combinations.

In the following text, the term "appliances" refer to primary appliances which carry power or arrangements of primary appliances such as lines, switches, busbars, switchfields, transformers, converters, FACTS (Flexible AC Transmission System) appliances, and compensation elements. This includes associated secondary appliances or control and instrumentation appliances, which control, regulate and protect the primary appliances.

A predetermined network function can thus be implemented by, as a rule, a number of arrangements or configurations of appliances. Different configurations have different line topologies and different appliances. They differ not only in the electrical characteristic values but also in characteristic values such as the procurement price, the operating and maintenance costs, the space requirement and the reliability or failure rates. Risks relating to delivery capability, price stability or suitability for function may also represent characteristics values.

An operator or owner of an electrical power distribution network asks himself questions about configuration of appliances which satisfy his requirements in an optimum manner when, for example, extending the capacity of his network or when replacing existing parts of this network. Depending on the nature of a network function to be implemented, certain technical requirements are specified in a fixed manner, while other requirements are weighed up against one another on the basis of characteristic values such as the price, reliability and space requirement. In order to determine an optimum configuration or in order to compare the number of configurations optimized on the basis of different criteria with one another, experts are required according to the prior art, who not only know the appliances which can be used and their characteristics but also have a simulation models of the individual appliances and simulation tools by means of which the technical response of different configurations can be simulated and compared. Problems in this case include the fact that experts are expensive, the network operator does not always have simulation models available, and the range of appliances is changing all the time.

According to the invention the configuration and, preferably the production as well, of simulation models of a configuration is automated by using a configuration model which describes all the possible configurations of appliances by means of a formal language. The configuration model can be used to produce all the possible configurations systematically. A set of requirements which are specified by a user is used to produce a set of all the configurations which satisfy these requirements. The characteristic values for each configuration are defined.

A configuration model and the systematic production of configurations are described in detail further below. The set of requirements comprise a minimum set of requirements, as well as further or optional requirements. The minimum set of requirements must be specified in every case for a specific network function.

By way of example, it is essential that a rated voltage U, a number of line outgoers nel and a number of transformer outgoers nct be specified for the "switch connections" network function. Optional requirements are a number nib of bus couplers and the details of a system type arr such as "single busbar", "single busbar with bypass", "double busbar", "ring configuration", "1 ½ circuit breakers".

It is possible for there to be no configuration which satisfies all the requirements in the first set and the second set. In this case, an appropriate message is produced, for example for the user, or an output parameter is set in an appropriate manner.

In one preferred variant of the invention, all the configurations that are produced are used to define an optimum configuration which optimizes a predetermined characteristic value, that is to say maximizes or minimizes it. By way of example, a price or a space requirement is minimized, or a reliability is maximized.

In terms of programming, one implementation of the invention is made accessible as software function or program function having a structure according to the expression $$x=\text{BBTtype}(P1 \ldots Pn, OP1 \ldots OPk, \text{OPopt})$$

where BBType denotes a network function, $P1 \ldots Pn$ are parameters which represent a minimum set of requirements, and $OP1 \ldots OPk$ denote further k optional parameters for representation of optional requirements. An optional parameter OPopt specifies which characteristic value is to be used for optimization, rather than the procurement price. An output value x is a vector whose various elements are, for example:

$x[1]$ Characteristic value for the existence of a solution $x[2]$ Characteristic value "procurement price" for the optimum solution $x[3]$ Characteristic value "operating costs" for the optimum solution $x[4]$ Characteristic value "reliability" for the optimum solution $x[5]$ Characteristic value "efficiency" for the optimum solution $x[6]$ Characteristic value "space requirement" for the optimum solution $x[7]$ Diagram of the optimum solution $x[8]$ Explanation of the optimum solution $x[9]$ Description of the optimum configuration.

The diagram and the description of the optimum configuration are represented by data structures or software objects which can be processed by a user interface 1 or a model generator 3.

In one preferred embodiment of the invention, a further characteristic value is defined as a weighted sum of other characteristic values.

FIG. 1 shows the results from a number of runs of the method according to the invention for defining configurations for satisfying the "switch connections" function. This corresponds to a number of calls to a program function of the type:

$$\text{Cost}=\text{Switchgear}(U, \text{nel}, \text{nct}, \text{arr}, \text{nib})$$

where nel$\leq$8, nct=0, nib=0 and the remaining parameters U and arr are varied. A least-cost variant for a switchgear assembly is in each case plotted for different rated voltages which are plotted along a horizontal axis, with the height of a bar corresponding to a procurement price for the switchgear assembly of a specific type. To this end, one or two further variants are plotted for each rated voltage, whose switchgear assembly type has been specified as a further requirement in the second set of requirements. The variants corresponding to the operational parameter arr are:
BS Single busbar,
BPT Single busbar with bypass,
BD Double busbar
An Ring configuration
DJM 1 ½ circuit breakers.

A program function such as this thus uses functional requirements as are expressed by the minimum set of requirements to define a solution configuration, that is to say a technical implementation, which carries out the appropriate network function in an optimum manner.

Figure 2:
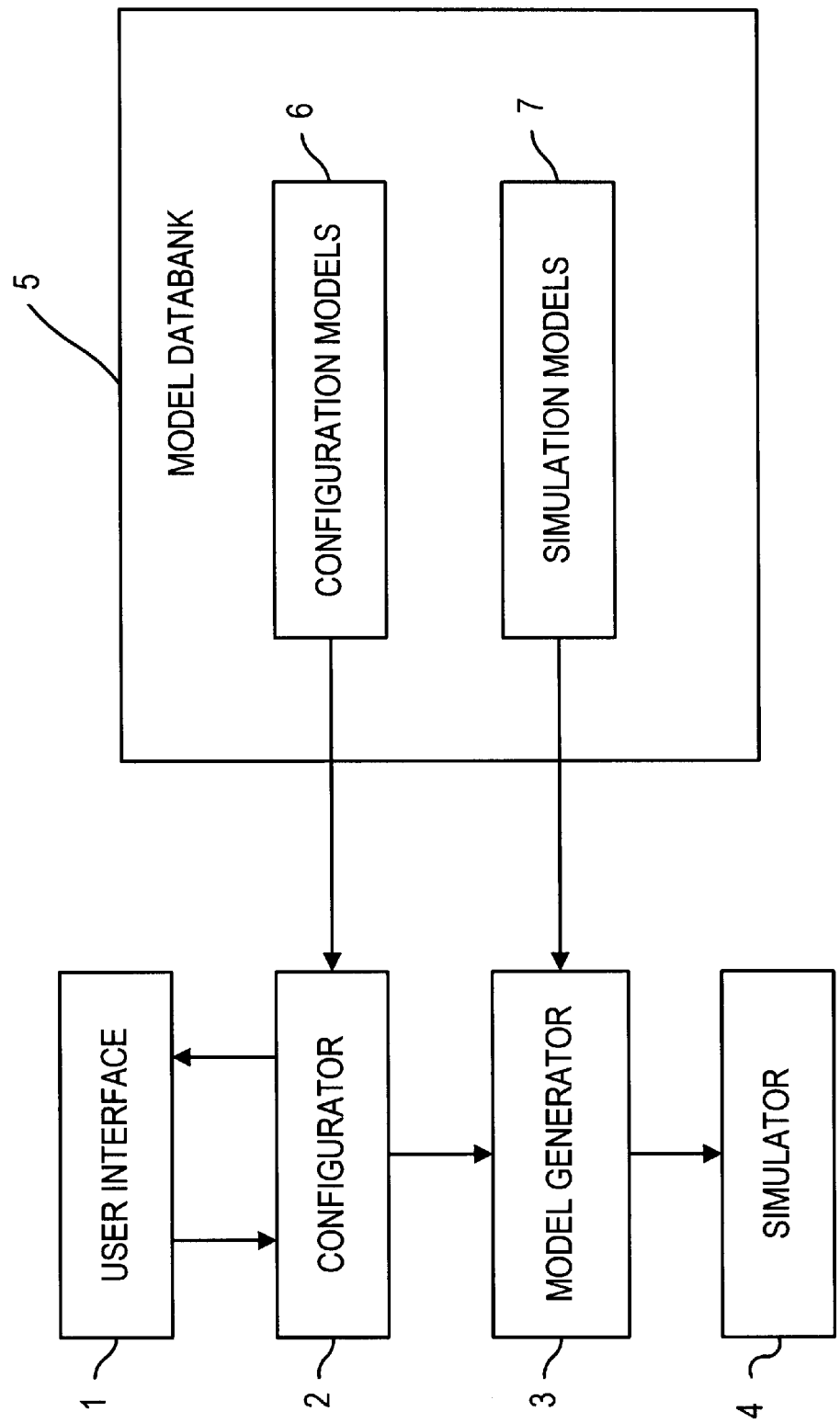
FIG. 2 shows, schematically, a software structure for a system for carrying out the method according to the invention.

FIG. 2 shows, schematically, a software structure for a system for carrying out the method according to the invention. The system has a user interface 1 for entering requirements and for displaying generated configurations, as well as a configurator 2 for determining a configuration of appliances which satisfies the requirements and optimizes a predetermined optimization criterion. The system has means for transmission 11 of the requirements from the user interface 1 to the configurator 2 and for transmission 12 of optimum configurations and associated optimized characteristic values to the user interface 1. The system also has a model generator 3 for producing a simulation model from a configuration, means for transmission 14 of an optimum configuration from the configurator 2 to the model generator 3, a simulator 4, and means for transmission 16 of simulation models of a network function from the model generator 3 to the simulator 4. Furthermore, the system has a model databank 5, which itself in turn has a collection of configuration models 6 for different network functions and collection of simulation models 7 of appliances. The system has means for transmission 13 of a configuration model from the collection of configuration models 6 to the configurator 2, as well as means for transmission 15 of simulation models of appliances from the collection of simulation models 7 and the model generator 3.

Figure 3:
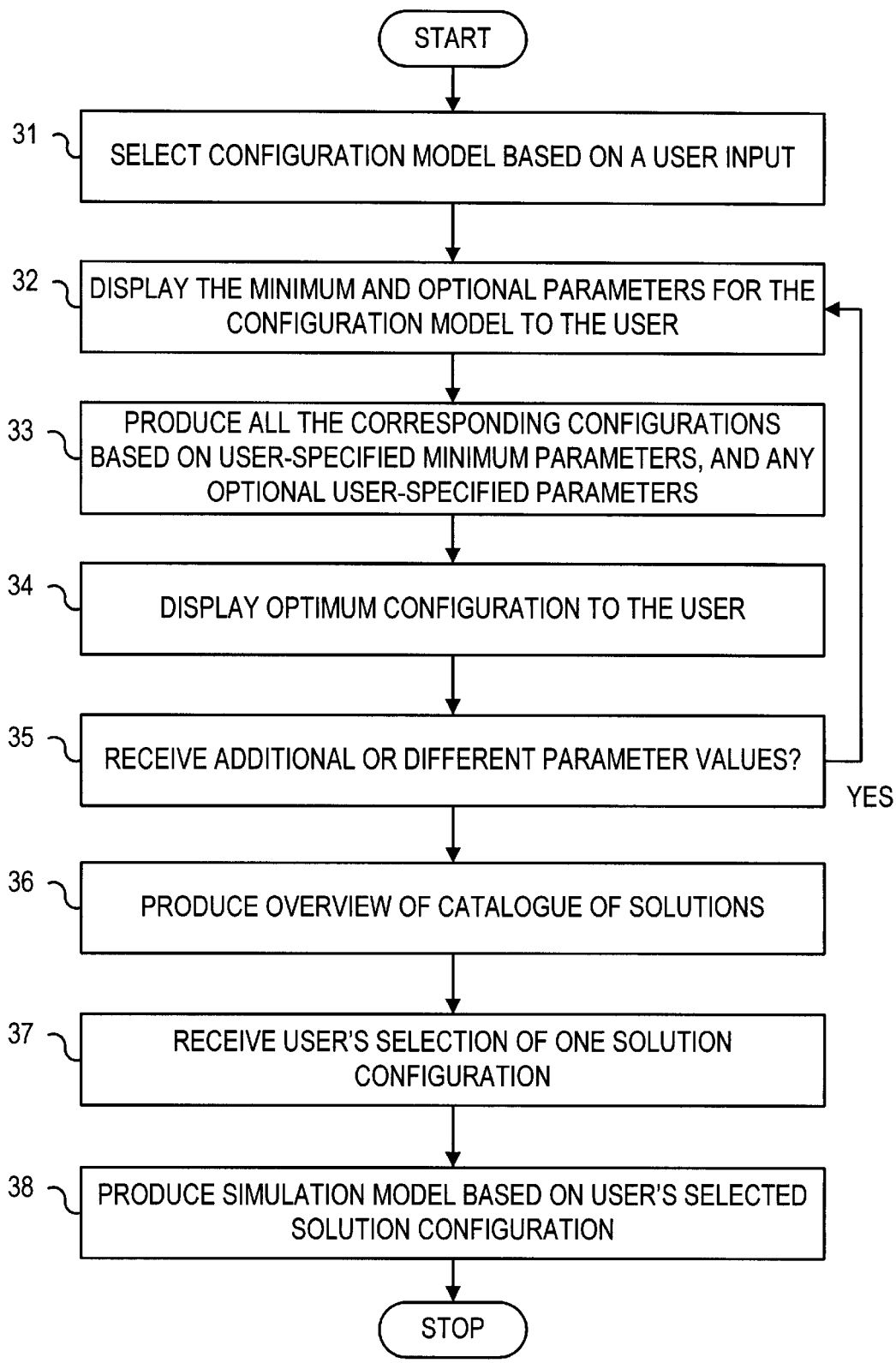
FIG. 3 shows a flowchart of the method according to the invention.

FIG. 3 shows a flowchart for one use of the method according to the invention. After the method starts in step 31, a configuration model is selected on the basis of a user input. In step 32, the minimum and optional parameters for the configuration model are displayed to the user, and the user specifies at least the minimum parameters. In step 33, all the corresponding configurations are produced on the basis of the minimum parameters, and any optional parameters which may be specified. In the process, analysis models are calculated in order to define characteristic values, and the optimum configuration is determined. In step 34, the optimum configuration is displayed to the user in some suitable manner, together with its characteristic values. The display comprises, for example, a text listing of the appliances in the solution configuration or a graphical display, based on the configuration model, in which only the components and appliances for the solution configuration as shown and parameters such as the cardinality of relationships are replaced by specific values.

The solution to the configuration is stored, together with the parameters which have led to it, in a catalog of solutions. In step 35, depending on a user input, the process either continues with step 32 or other parameter values are used to produce a further solution configuration, or an overview of the catalogue of solutions is produced in step 36. Such a comparative overview in graphical form is shown by way of example in FIG. 1. By way of example, the three bars for a value U=345 kV correspond to the costs for different solution configurations, as determined by carrying out steps 32 to 35 a number of times and by manually varying the optional parameter arr. In step 37, the user selects one solution configuration from which a simulation model is automatically produced, in step 38.

The configuration model which is used and the automatic generation of configurations will be explained in the following text. A comprehensive description of the configuration model can be found in "Modeling configurable Product Families", Juha Tiihonen et al., 4th WDK Workshop on Product Structuring, Oct. 22–23, 1998, Delft University of Technology. The content of this publication is hereby included in this application.

Figure 4:
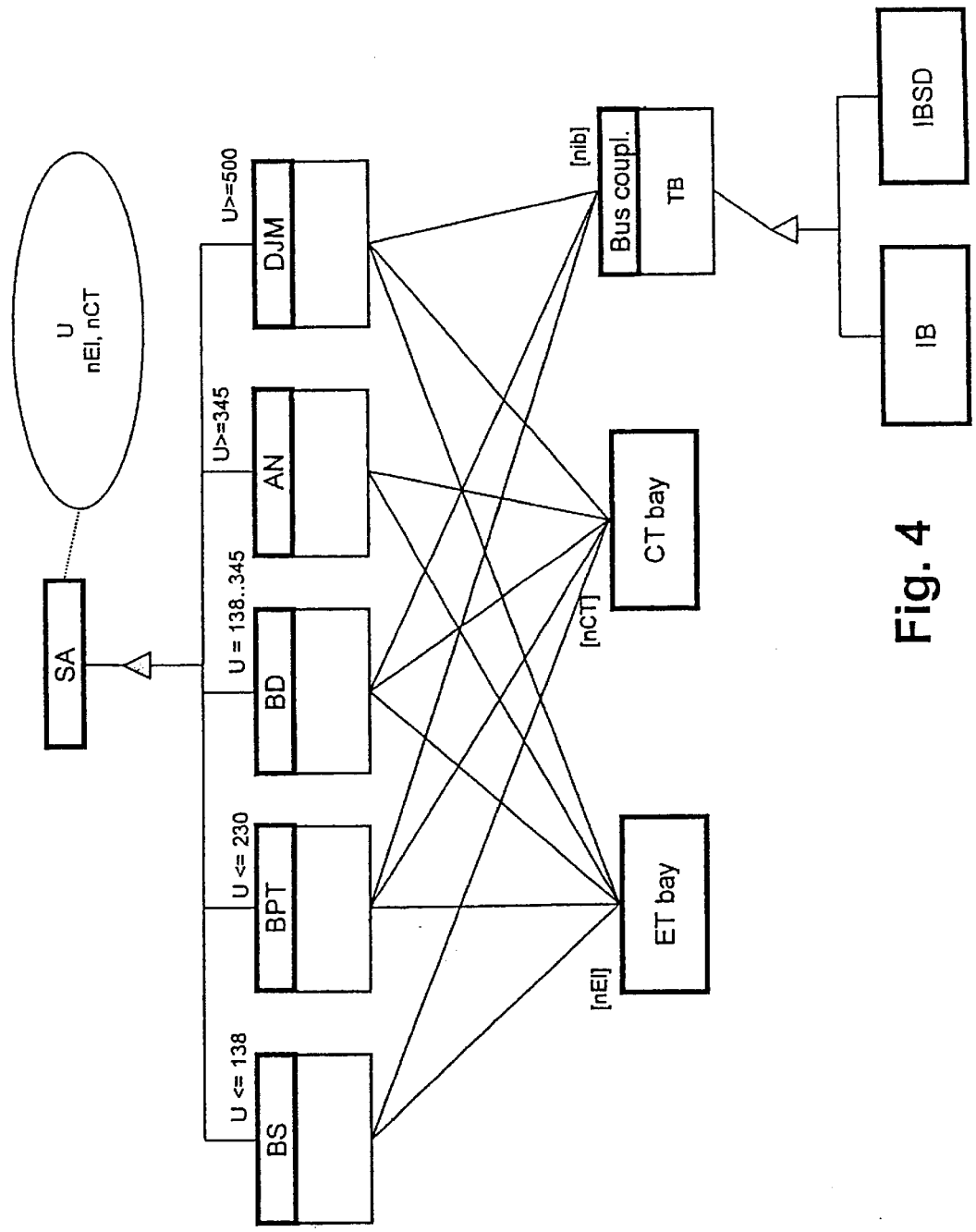
FIG. 4 shows a graphical illustration of a simplified configuration model of a switchgear assembly.

FIG. 4 shows a graphical illustration of a highly simplified configuration model of a switchgear assembly, which matches the previously used examples. Appliances in the switchgear assembly are regarded in an abstract manner as "components" in the configuration model, with the term "appliance" also covering arrangements comprising a number of individual appliances, as described above. By convention, a component is defined recursively as comprising one appliance or one or more components. Components of the switchgear assembly are represented by blocks in the drawing. Normal lines between blocks indicate that an upper component as seen in the drawing has a lower component as part of it. A figure in rectangular bracket at the end of a line indicates a cardinality of this relationship, that is to say a number of lower components which the upper component has. A line marked with a triangle indicates an "is a" or "is an" relationship. For example, a component "SA", which represents a switchgear assembly, is equivalent to a component "BS", "BPT", "BD", "AN" or "DJM". These components represent different topology variants of a switchgear assembly. The component "BS" has nel components "ET bay", nct components "CT bat" and nib components "Bus coupl.". The component "Bus coupl." is a component "IB" or a component "IBSD".

Requirements for a configuration correspond to characteristics of relationship or of components which are entered above the components. For example, the expression "U<= 138" means that the component "BS" can be used only for values of the rated voltage below 138 (kV).

In order to automatically produce all the configurations which satisfy the minimum requirements for U, nel and nct and, if appropriate, the optional requirements as well, a search tree which is defined by the configuration model is produced, starting from the block "SA", in a known manner using, for example, a depth search or a width search.

By way of example, let us assume that the minimum requirements are specified to be U=300, nel=3, nct=2. This corresponds to a functional requirement that connections be made between three line outgoers and two transformers. The component "SA" cannot be a component "BS" since its condition U<=138 is not satisfied. The sample applies to the component "BPT". However, the component "SA" may be a component "BD". Based on the requirements nel and nct, the component "BD" has three components "ET bay" and two components "CT bay". Since the parameter nib and its value are not specified, nib is set to be 0, as standard, since this results in the least-cost solution. If the specification of U allows a number of options in order to implement the component "SA", then the more expensive options are excluded. The procurement price for the configuration is calculated, for example, as the sum of a basic price for the component "BD" and prices for the components "ET bay" and "CT bay", multiplied by the respective number of components. The surface area required is determined, for example, by addition of the surface area requirement of the components. There are a large number of methods and software tools in existence for defining reliability characteristic values. Fundamental principles can be found, for example, in IEEE Standard 493-1997 or in J. Endrenyi: Reliability Modeling in Electric Power Systems, John Wiley & Sons, New York 1978.

Methods for defining characteristic values are based on associated analysis models. An analysis model is a software representation of a method for defining a characteristic value for a configuration on the basis of information about individual components in the configuration. The nature of the analysis models and the nature of this information are governed by the nature of the associated characteristics value. By way of example, an analysis model for defining reliabilities or failure probabilities processes parameters such as MTBF ("Mean time between failure") of individual components as well as information about the structure of a specific configuration. An analysis model for defining the procurement price essentially determines a sum of component prices and appliance prices. An analysis model for defining a control response, a control system stability, a transient stability, a voltage stability or an oscillation characteristic of a configuration has, by way of example, a dynamic simulation model which if formed automatically from simulation models of the components in the configuration. An analysis model for defining a voltage response has, for example, a short-circuit volt-amperes model. An analysis model for defining compensation characteristics has, for example, a load flow model.

The component "SA" may also be a component "AN" or a component "DJM". Characteristic values are also calculated for these configurations. Overall, there are thus three configurations with their characteristic values and it is possible to determine that configuration which, by way of example, has the lowest procurement price.

The configuration model preferably has so-called boundary conditions, which relate parameters for different components to one another. By way of example, the choice of a specific type of switch in a first switchfield restricts the choice of switches in other switches of this type.

The example described above has been extremely simplified in order to simplify the explanation. More complex configuration models with a number of hierarchy levels of components produce a large number of configurations. The automatic production of configurations is known from the "enumeration theory" and is described in more detail, for example, in "Graphen, Netzwerke and Algorithmen" [Graphs, networks and algorithms], Dieter Jungnickel, 3rd edition, Mannheim, Leipzig, Vienna, Zurich, BI-Wissenschafts-Verlag, 1994.

Figure 5:
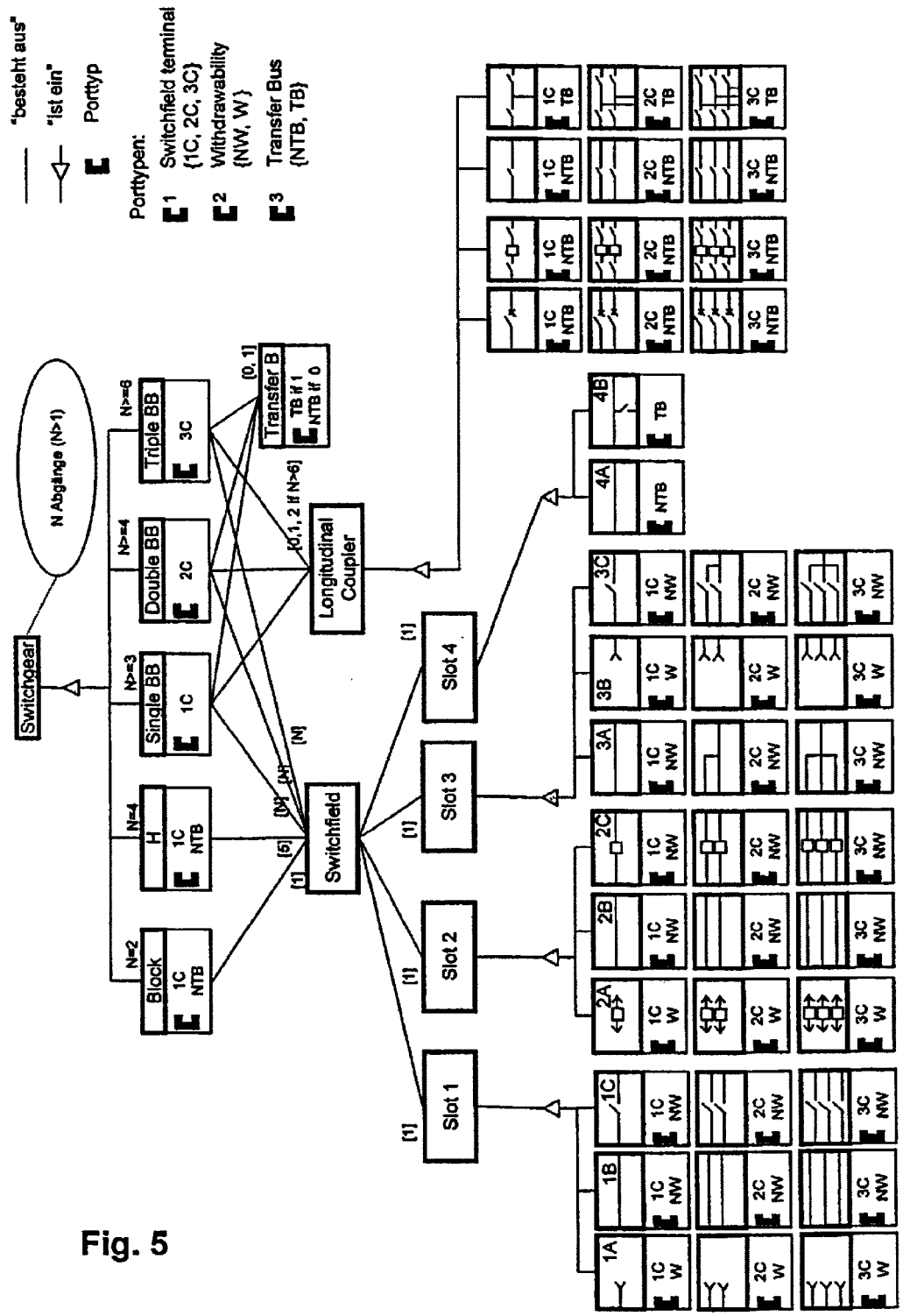
FIG. 5 shows a graphical illustration of a detailed configuration model of a switchgear assembly.

FIG. 5 shows a graphical illustration of a detailed configuration model of a switchgear assembly "Switchgear". The minimum requirement in this case is only a number N of outgoers. The choice of topology variants and components "Block", "H", "Single BB", "Double BB", "Triple BB" is restricted on the basis of N. The component "Block" comprises one, and only one, component "Switchfield" while in contrast the component "H" comprises five components "Switchfield". The component "Single BB" comprises N components "Switchfield", one or no component "Transfer B" and, based on N, a component "Longitudinal coupler". In each case, the component "Switchfield" comprises one, and only one, component "Slot 1" to "Slot 4".

"Slot 1" can in turn be implemented by one of nine different components, some of which are annotated by the text in FIG. 5 and are distinguished by graphical symbols. "Slot 2" and "Slot 3" can each be implemented by one of in each case nine other components, and "Slot 4" can be implemented by one of two further components.

Consistency conditions are formulated as characteristics of interfaces or ports between components. There are a number of interface types, and there may be one, two or more interface types between two components. In the present example, a first interface type of the "Switchfield Terminal"type has values {1C, 2C, 3C}, a second interface type of the "Withdrawability" type has values {NW, W}, and a third interface type of the "Transfer Bus" type has values {NTB, TB}. Only the values for existing interface types are shown in FIG. 5, in each case in one block that is shown; the fact that an interface is present is implied by the indicated value or values. A further condition in the "Transfer B" component states the number of [0,1] of this component is equal to unity if the third interface type has the value "TB", and that the number is zero if the third interface type has the value "NTB".

A configuration is consistent with a consistency condition if all the interface types of all the components have the same values. Components without a consistency condition match all the components by definition.

Figure 6:
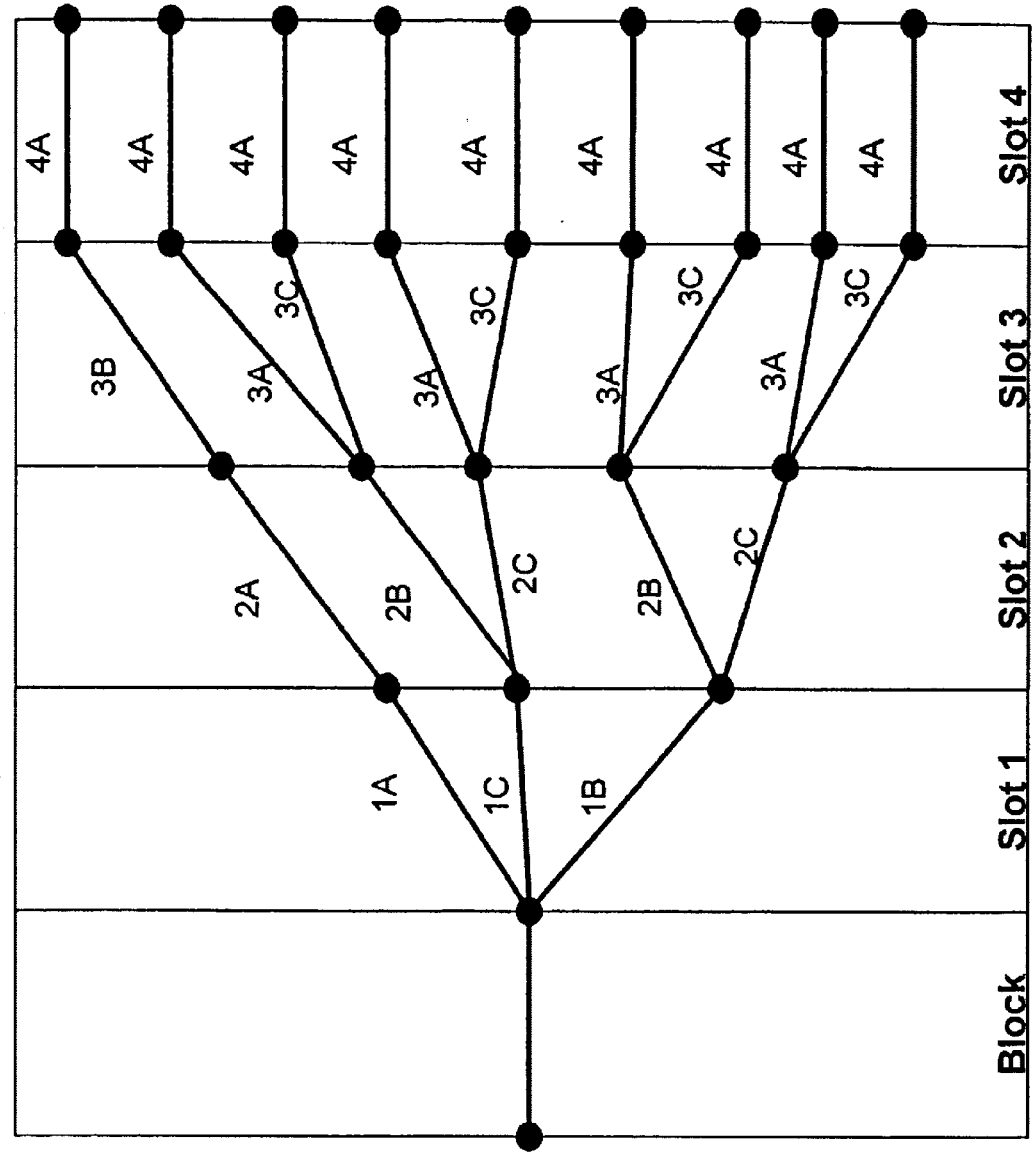
FIG. 6 shows a search tree for producing configurations on the basis of the configuration model from FIG. 5.

FIG. 6 shows a search tree for producing configurations on the basis of the configuration model from FIG. 2. This is based on the assumption that the minimum parameter is chosen to be N=2. This states that "Switchgear" is a "Block" which in turn has one, and only one, "Switchfield". All the different configurations of the four components of "Switchfield" are now produced systematically, stating by choosing variants of "Slot 1". This production process could also start with another "Slot", with the same result.

"Slot 1" is of the "1A", "1B" or "1C" type. If "Slot 1" is implemented by the "1A" component, "Slot 2" can be implemented only by the "2A" type on the basis of a consistency condition, since the first interface type must have the value "1C", and the second interface type must have the value "W". If "Slot 1" is implemented by the component "1C", only "Slot 2" can be implemented only by the two components "2B" or "2C" on the basis of a consistency condition, since the first interface type must have the value "1C" and the second interface type must have the value "NW". In the same way, taking account of the consistency conditions, all the variants of "Slot 3" and "Slot 4" are checked, thus completing the search tree shown in FIG. 6. Each path from the root of the tree to a leaf describe one possible configuration. IF N>6, then the tree would need to be extended on the basis of the variants of the "Longitudinal Coupler" component.

In one preferred variant of the invention, the configurations are not all produced completely and the characteristic values are not subsequently defined for each complete configuration, but with one or more characteristics values being readjusted continually during the production of a configuration. If a characteristic value falls below 442 or rises above a value which another configuration has already reached, the production of a configuration is terminated, and the process continues with the production of a next configuration. By way of example, when searching for a cost-optimized configuration, a previously best configuration is stored, and the production of a specific new configuration is terminated as soon as its price exceeds the price of the previously best configuration. This reduces the amount of storage and the computation complexity for generating possible configurations.

A configuration model is represented internally, by way of example, by means of a text representation language. Expressions which are written in this language are read by a data processing unit which uses them to produce data structures which represent the configuration models.

The solution configuration results in a structure or topology of its electrical connections being known and, in particular, the electrical characteristics and parameters of the appliances in the structure being known. All the information is thus available which is required to define a simulation model from component models of the appliances. The automatic production of a simulation model for the solution configuration on the basis of this information is carried out, for example, for or using a known simulation program for dynamic simulation such as Matlab/Simulink™ or Dymola™.

In summary, the method according to the invention for configuration of a part of an electrical power distribution network, in which case this part of the power distribution network can be implemented by a number of different configurations of appliances, is characterized in that a totality of possible configurations is described in a data-processing unit by a computer-legible configuration model, in which case the method carries out the following steps:

Definition of a set of functional requirements for a configuration, for example based on a user input or by means of a higher-level design system.

Systematic production of a set of all the possible configurations which satisfy the set of functional requirements, in which case each possible configuration may have at least one associated characteristic value.

Automatic definition of a solution configuration which optimizes a predetermined characteristic value of he solution configuration.

One preferred embodiment of the invention makes use of the network function, this is to say the part of the power distribution network under consideration, as a node in the power distribution network, that is to say as a switchgear assembly, as a connecting line, for transformation of voltages, for compensation for the wattless component, for conversion of DC voltage to AC voltage or vice versa, for harmonic filtering, for controlling a power flow, or for current limiting.

In a further preferred embodiment of the invention, the model data is stored and processed on a physically distributed basis in that, by way of example, the model databank 5 is stored in memory unit at a manufacturer's premises, and/or is administered and updated by the manufacturer, while the configuration, user interaction and use of the simulation models that are produced are carried out on a data processing unit on behalf of a network operator. This has the advantage that the manufacturer can modify the model databank when new or modified appliances become available. These changes are implemented automatically for the network operator as a user of the method according to the invention without he himself having to be concerned about this modified data for the appliances being offered.

In another preferred embodiment of the invention, network functions, and hence also configuration models, are organized hierarchically. In this case, by way of example, a block in a first, higher-level configuration model is associated with a second, lower-level configuration model. Parameters and consistency conditions are interchanged between the two configuration models, so that all the possible configurations can be produced as already described.

The hierarchy levels of the network functions can be incorporated in these configuration models. For example, a top hierarchy level includes network functions such as "transmit power", "feed in power" or "draw power". The network function "transmit power" has the network functions "point-to-point connection", "multipoint connection" or "switch connection". These network functions are in turn at a higher level than, for example, the network functions "wattless component compensation", "current regulation", "voltage transformation", "control power flow" or "limit current". Functions are specified in more detail by functions attributes such as "with specific reliability" or "with specific availability". A higher-level network function is thus formed from a number of subordinate network functions. If this is done over a number of hierarchy levels, then the higher-level network function is formed by a tree of network functions.

In one advantageous variant of this embodiment, during the production of possible configurations in the higher-level configuration model, an appropriate program function is called which, as described above, determines the optimum configuration for implementation of the lower-level network function on the basis of the lower-level configuration model. Such local optimization greatly reduces the combination explosion of the number of possible configurations under consideration.

List of Reference Symbols

1 User interface
2 Configurator
3 Model generator
4 Simulator
5 Model databank
6 Collection of configuration models for different network functions
7 Collection of simulation models of appliances
11 Transmission of a requirement specification
12 Return message about optimum configurations and their characteristic values
13 Transmission of a configuration model
14 Transmission of an optimum configuration
15 Transmission of simulation models of appliances
16 Transmission of a simulation model of a network function

What is claimed is:

1. A method for configuring a part of an electrical power distribution network wherein the part of the electrical power distribution network is configurable and comprises a number of appliances and wherein a totality of possible configurations of the part of the electrical power distribution network is described by a configuration model, in which case the method comprising:

defining a set of requirements for a configuration to be defined, producing all the possible configurations which satisfy the set of requirements, wherein each possible configuration may have at least one associated characteristic value, and defining a solution configuration which optimizes a predetermined characteristic value.

2. The method as claimed in claim 1, wherein a simulation model for simulation of a technical response of the solution configuration is defined automatically.

3. The method as claimed in claim 1, wherein the predetermined characteristic value which is optimized by the solution configuration is one of the following:

procurement costs of the configuration, space required by the configuration, reliability of the configuration, risk of the configuration, efficiency of the configuration, or maintenance costs of the configuration or is calculated as a weighted sum of a number of these characteristic values.

4. The method as claimed in claim 1, wherein the part of the power distribution network is used as a node in the power distribution network, as a connecting line, for transformation of voltages, for compensation for a wattless component, for conversion of DC voltage to AC voltage or vice versa, for harmonic filtering, for controlling a power flow or for current limiting.

5. The method as claimed in claim 1, wherein the part of the power distribution network is described by its technical function as a network function, and wherein requirements for a network function are formulated as functional requirements and are used as requirements for a configuration to be defined for implementation of this network function.

6. The method as claimed in claim 5, wherein a higher-level network function has a number of hierarchically subordinate network functions.

7. The method as claimed in claim 6, wherein a network function has an associated program function which defines the solution configuration on the basis of parameters which specify requirements for the network function, and wherein a higher-level program function calls a number of hierarchically subordinate program functions.

8. A computer program product for configuration of a part of an electrical power distribution network, which can be loaded into an internal memory in a digital data processing unit and has computer program code means which, when embodied in a digital data processing unit, cause the digital data processing unit to:

define a set of requirements for a configuration to be defined, produce all the possible configurations which satisfy the set of requirements, in which case each possible configuration may have at least one associated characteristic value, and define a solution configuration which optimizes a predetermined characteristic value.

9. A system for configuring a part of an electrical power distribution network wherein the part of the electrical power distribution network is configurable and comprises a plurality of appliances, the system comprising:

means for transmitting configuration models to a configurator, wherein a configuration model describes a totality of possible configurations, and means for defining a set of requirements for a configuration to be defined, wherein the configurator has means for systematic production of all the possible configurations which satisfy the set of requirements, in which case each possible configuration may have at least one associated characteristic value, and means for defining a solution configuration which optimizes a predetermined characteristic value.

10. The system as claimed in claim 9, wherein the system has a model generator for for producing a simulation model from one configuration.

* * * * *